United States Patent [19]

Hodgson

[11] 4,299,440
[45] Nov. 10, 1981

[54] MICROSCOPE STAND FOR MICROSCOPE OPTICS AND A MUTUALLY PERPENDICULARLY ADJUSTABLE WORK STAGE IN AN INTERMEDIATE FOCUSING PLANE

[76] Inventor: R. W. Hodgson, 1680 N. Vine St., #204, Hollywood, Calif. 90028

[21] Appl. No.: 13,196

[22] Filed: Feb. 22, 1979

[51] Int. Cl.³ .................................................. G02B 7/00
[52] U.S. Cl. ....................................................... 350/81
[58] Field of Search ................... 350/81, 50, 86 C, 16, 350/22, 28, 35, 36; 356/322, 327

[56] References Cited

U.S. PATENT DOCUMENTS

| | | | |
|---|---|---|---|
| 2,939,633 | 6/1960 | Robinson | 350/81 |
| 3,437,929 | 4/1969 | Glenn | 350/81 |
| 3,570,303 | 3/1971 | Fried et al. | 350/81 |
| 3,600,057 | 8/1971 | Leffler | 350/81 |
| 3,680,947 | 8/1972 | Wanesky | 350/81 |
| 3,797,100 | 3/1974 | Brown | 350/81 |
| 3,892,484 | 7/1975 | Tsuboshima et al. | 350/81 |
| 3,930,809 | 1/1976 | Evans | 350/81 |
| 4,153,371 | 5/1979 | Koizzmi et al. | 350/81 |

*Primary Examiner*—John K. Corbin
*Assistant Examiner*—B. W. de los Reyes

[57] ABSTRACT

An improved microscope stand of an extremely rigid, deep-throat, substantially c-shaped, hollow construction having an extremely high effective modulus of elasticity and stiffness of an extended microscope-optic-supporting upper cantilever arm relative to a lower base portion whereby to minimize any relative vertical displacement therebetween which might tend to produce a de-focusing action of such microscope optics and adapted to controllably positionally adjustably mount a large work stage in an intermediate focusing plane within a deep-throat portion of the stand, and providing controlling large magnitude movement thereof in mutually perpendicular, substantially horizontal, x and y directions, and with the hollow construction providing interior mounting of electrical and electronic accessory equipment and maximizing the strength-to-weight ratio of the entire stand.

9 Claims, 15 Drawing Figures

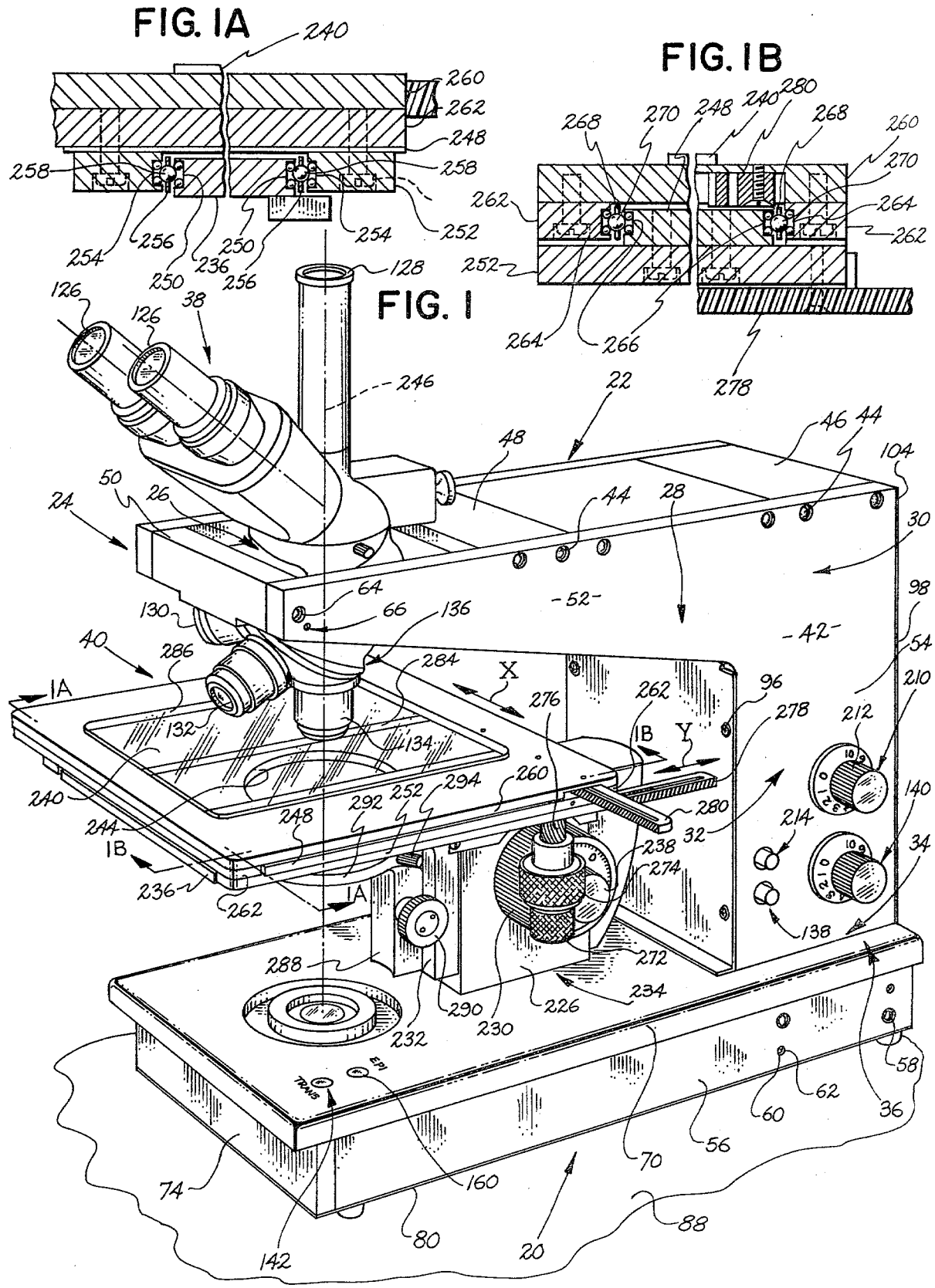

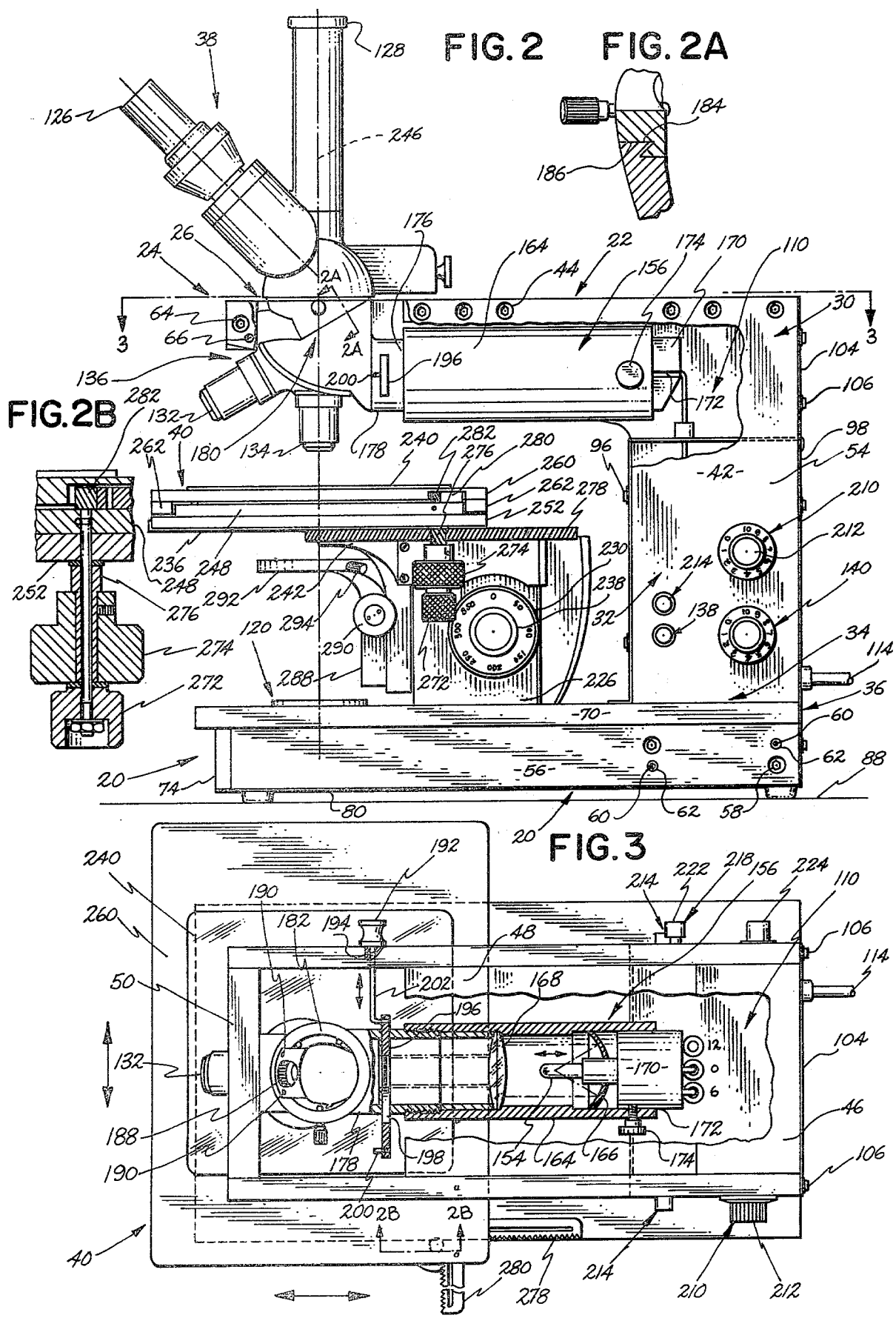

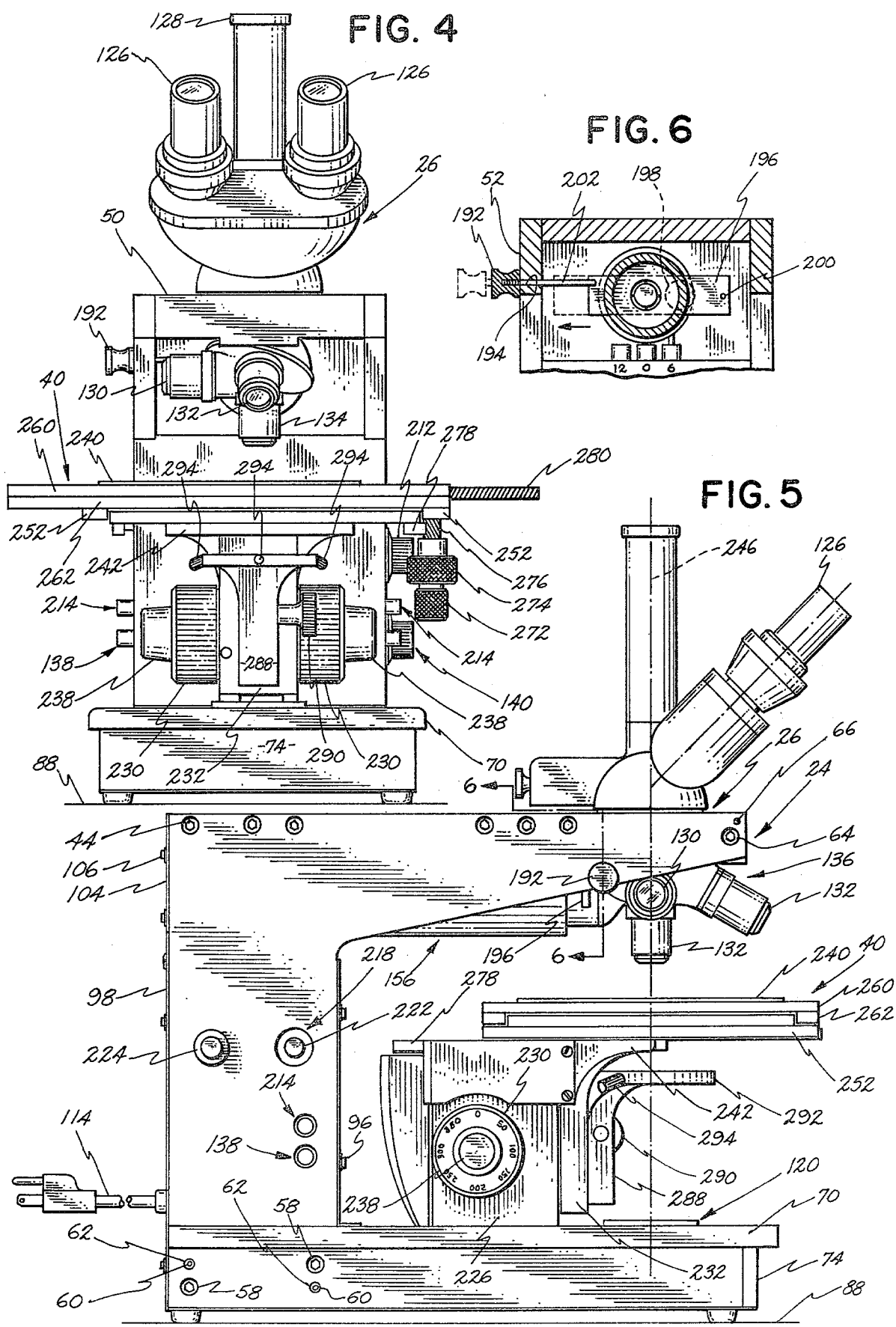

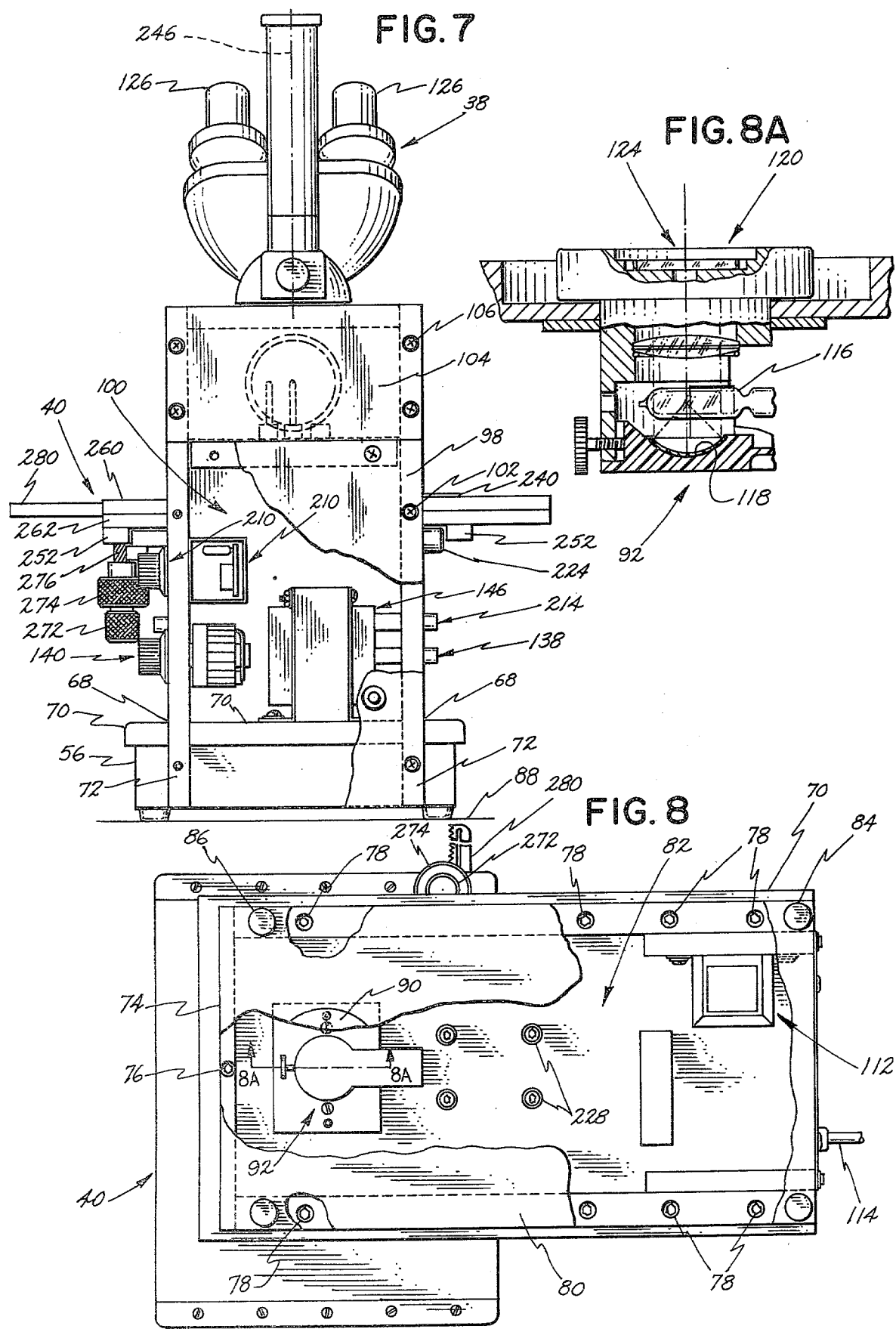

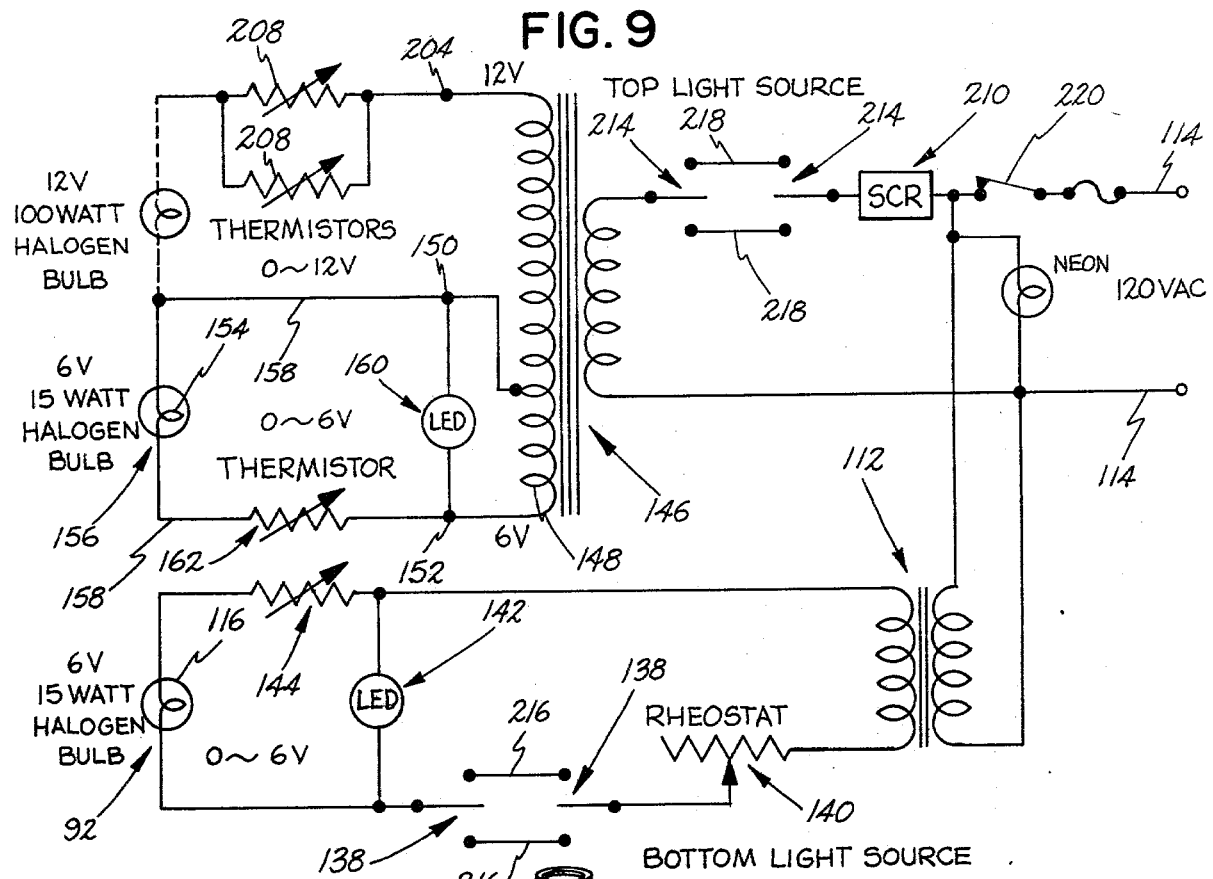
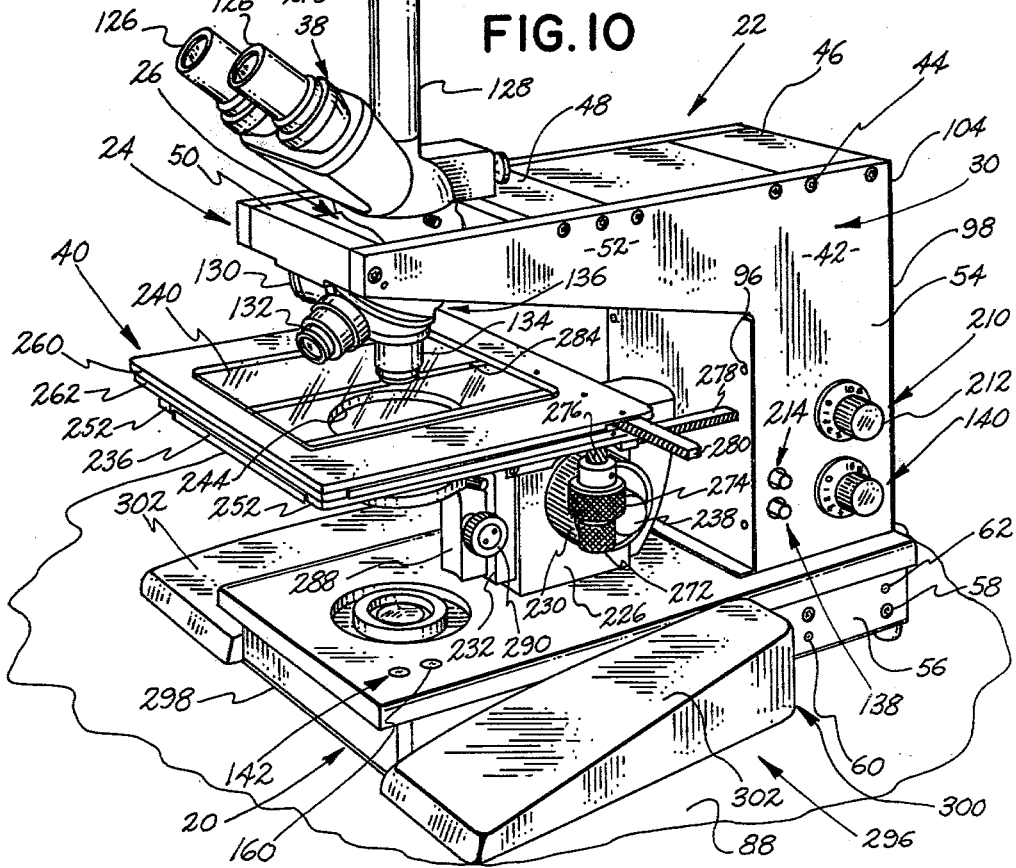

MICROSCOPE STAND FOR MICROSCOPE OPTICS AND A MUTUALLY PERPENDICULARLY ADJUSTABLE WORK STAGE IN AN INTERMEDIATE FOCUSING PLANE

BACKGROUND OF THE INVENTION

The field of the invention is generally that of microscopes and, more particularly, the type of microscope requiring a relatively large range of adjustment of an intermediate work stage adapted to be positioned in an intermediate focusing plane. This particular type of microscope is frequently used for microscopic assembly and/or repair work in connection with what is known as integrated circuits and/or printed circuits where minute effective circuit components and inter-connecting effective circuit leads are initially produced and subsequently inspected while being viewed through a microscope, usually of the binocular eyepiece type, although not specifically so limited. If the printed or integrated circuit extends over a substantial lateral distance, it will be necessary to adjust the intermediate work stage in either an x or y direction, or both, while maintaining its position in a horizontal focusing plane. The magnitude of the positional adjustment may greatly exceed that provided for and permissable in the work stage of many conventional prior art microscopes where relatively small movement, other than focusing movement is possible. Thus, a relatively deep-throated microscope stand is required in order to make possible the larger magnitude adjusting movement of the intermediate work stage which is desired in such a specialized field of use of such a microscope. Most prior art microscopes and microscope stands if either initially designed for, or substantially modified for, the above-mentioned specialized type of use, have a very substantial tendency to defocus frequently as a consequence of the effect of various types of external environmental conditions, such as external vibration or the like and this is extremely disconcerting to a worker who is viewing a workpiece on the intermediate work stage either in a stationary position or after it has been transversely adjusted in the x or y direction from an initial accurately focused position. Whenever such undesired defocusing action occurs, it is immediately necessary for such a worker to attempt to readjust the relative positions of the microscope optics and the intermediate work stage so as to bring the workpiece surface back into sharp focus. This is sometimes difficult to do promptly because the worker does not even know in which direction the adjusting re-focusing action should take place and considerable experimental adjustment may be necessary before sharp focus is again regained. It would be highly desirable to provide a microscope stand capable of retrofitting engagement with respect to one or more standard set of microscope optics and/or intermediate work stages and which would provide for the desired maximized movement of the work stage in both x and y directions in an intermediate focusing plane and of a greatly enhanced effective stiffness-to-weight ratio and greatly enhanced strength-to-weight ratio whereby to greatly minimize or substantially entirely eliminate the above mentioned type of accidental and undesired defocusing action. It is precisely such a highly desirable and advantageous type of microscope stand which is provided by and in the present invention, and which has advantages of the type referred to above virtually completely overcoming problems, disadvantages, and limitations of the above-mentioned type of prior art microscope and microscope stand constructions, and wherein all of said advantages flow from and occur by reason of, the specific features of the invention pointed out hereinafter.

SUMMARY OF THE INVENTION

Generally speaking, the improved microscope stand of the present invention is of a deep-throat, substantially rigid and substantially non-defocusing construction and may be said to be of substantially C-shaped configuration and of substantially hollow construction including a lower substantially horizontally directed base portion (of partially or substantially completely interiorly hollow construction), a vertically upwardly spaced and substantially horizontally directed upper cantilever supporting arm (usually at least partially or substantially completely hollow) having an outer end provided with microscope-optics-supporting means and having an inner or rear end provided with and effectively connected rigidly to, an upper end of an upstanding innerconnecting column or post portion (preferably at least partially hollow and generally substantially completely hollow) which, in turn, has a bottom end rigidly connected to an inner or rear end of said base portion. In a preferred form, the hollow vertical column portion of the stand and preferably at least parts of the base portion and the upper cantilever supporting arm are defined by high-strength and usually work-hardened and work-stiffened outer plates rigidly fastened together by high-rigidity, close-tolerance, mating screw, dowel pin and hole means rigidly fastening said plates together to define corresponding hollow interior chamber portions whereby to provide the effective C-shaped stand in a form of minimal weight and maximum stiffness having an effectively maximized strength-to-weight ratio and an effectively maximized stiffness-to-weight ratio. The base portion is provided with mounting means for mounting an intermediate work stage in an intermediate focusing plane for mutually perpendicular and controllably adjustable movement in substantially horizontal x and y directions. The effectively maximized strength-to-weight ratio and stiffness-to-weight ratio minimizes deflections of the extended microscope-optics-supporting means provided at an outer end of the cantilever supporting arm relative to the intermediate work stage adapted to be carried by the base portion in a manner which minimizes or substantially prevents effective defocusing of such microscope-optics relative to a work piece effectively carried on such a work stage. The hollow interior chamber portions of the stand are adapted to carry electrical and/or electronic accessory equipment for use with a complete microscope comprising said stand when provided with and carrying microscope optics and an interiorly positioned work stage lying in an intermediate focusing plane and effectively controllably positionally adjustably carried by the base portion. Upper or reflected light illuminator means is provided above the work stage and intermediate focusing plane level and has corresponding electric circuitry and corresponding upper illumination-controlling switch means carried in two upper locations on each side of said vertical column portion. Lower or transmitted light illuminator means is provided below the work stage and the entire focusing plane and has corresponding electric circuitry and a pair of lower illumination-controlling switch means located in corresponding lower positions on each side of said vertical column portion. Each of said illuminator means, switch means and corresponding electric circuitry means is effectively provided with externally extending electrical connector means adapted to be controllably connected to a conventional source of electrical power. Said upper and lower illuminator means are further provided with manually controllably adjustable illumination intensity control members carried by said vertical column portion, also in corresponding upper and lower positions (adjacent to the corresponding upper and lower illumination switch means on at least one side of said vertical column portion.) In one preferred form, the electric circuit portion connected to the upper and lower illuminator means are individually and correspondingly provided with upper and lower illumination-indication means carried in corresponding more remote and less remote positions relative to a user on an upper surface part of said base portion of the stand in a manner whereby the nearest (least remote) illumination indication means corresponds to and will be illuminated by energization of the lower illuminator means and whereby the farthest (most remote) illumination indication means corresponds to and will be illuminated by energization of the upper illuminator means.

In one preferred form of either the upper illuminator means, or the lower illuminator means, or both of the same, the corresponding electric circuitry, or circuit portions, connected thereto is, or are, provided with thermally-responsive variable-resistance means having a variable resistance temperature coefficient substantially the inverse of, or inversely directed with respect to, the corresponding variable resistance temperature coefficient of the corresponding illuminator means and is effectively connected in circuit therewith in a manner such as to substantially compensate for said variable resistance temperature coefficient of the illuminator means whereby to provide protection thereof from temporary excess current flow during any change of the energization state of the illuminator means—usually primarily comprising the change of state from a non-energized condition to a fully-energized condition, although not so specifically limited in all forms of the invention. For example, when the illuminator means is turned on, particularly when an expensive halogen, or other equivalent type, illuminator lamp is employed, there is an initial large surge of current because of the low resistance provided by the cold lamp. This is moderated rapidly as the lamp temperature rises and the lamp resistance is correspondingly modified. However, during that initial short period of time after energization, the illuminator lamp means is very vulnerable to being burned out rather quickly. The use of what are known in the art as "Thermistors," or other functional equivalent, in a compensating manner eliminates such premature lamp burn-out.

In a preferred form, virtually all of the electrical circuitry associated with the illuminator means, the illumination-controlling switch means and the illumination-indication means is carried within the hollow interior chamber portions defined within the hollow stand.

OBJECTS OF THE INVENTION

With the above points in mind, it is an object of the invention to provide a novel improved microscope stand of a deep-throat, substantially rigid and substantially non-defocusing construction adapted to provide for the controllably positionally adjustable mounting of a large work stage (and any work pieces adapted to be carried thereon) in an intermediate focusing plane relative to microscope optics adapted to be mounted thereabove by said stand and capable of controllable large magnitude movement of such an intermediate work stage in such a focusing plane in mutually perpendicular, substantially horizontal x and y directions, with the stand construction being of large effective cross-sectional, hollow, extremely rigid, substantially C-shaped configuration, preferably formed through the use of work-hardened and/or work-stiffened outer plates rigidly fastened together in a close-tolerance manner by screw, dowel pin and mating hole constructions, (or functional equivalents thereof) in a manner which provides a maximized strength-to-weight ratio and a maximized stiffness-to-weight ratio particularly with respect to the microscope-optics supporting outer end of a cantilever arm portion of the C-shaped stand relative to the intermediate work stage positioned thereinbelow in an intermediate focusing plane whereby to greatly minimize or virtually eliminate vibration-caused defocusing action of the microscope optics relative to a work piece supported on the intermediate work stage.

It is a further object of the invention to provide such a microscope stand wherein the hollow interior portions thereof define interior chamber portions adapted to receive and conceal substantially all of the electrical and electronic circuitry components which may be used in association with the microscope.

It is a further object of the invention to provide a novel microscope stand of the character referred to herein, generically and/or specifically, which may include any or all of the features referred to herein, either individually or in combination, and which is of a type adapted to cooperate with a variety of different forms of conventional microscope optics either at the time of original manufacture or subsequently in a retrofitting manner and which, further, is of relatively simple, reliable readily portable construction suitable for ready mass manufacturing, production and distribution of the improved stand in any of various different forms at reasonable cost, both as to the initial capital cost (including production set-up cost) and as to subsequent per-unit manufacturing cost whereby to be conducive to relatively widespread production, distribution and use of the novel non-defocusing microscope stand of the present invention for the purposes outlined herein or for any substantially equivalent or similar purposes.

It is a further object of the invention to provide such a miscroscope stand which readily lends itself to cooperation of the microscope optics with a closed circuit television system for either direct viewing or magnified viewing on a television monitor screen positioned at a convenient location for easy viewing by a person working at a microscope supported by the novel stand of the present invention. For example, it might be convenient to have the closed circuit television system provide an additional ten-power magnetization which would increase the size of all objects on the work stage being viewed, although there would be no increase in resolution. This would provide minimal strain on persons working at such a microscope for relatively long periods of time.

It is a further object of the present invention to provide a novel improved microscope stand of the type defined herein wherein the upper and lower illuminator means are adapted to be controlled from either side of the microscope stand by the use of double pairs of illumination-control switches carried by the upstanding interconnecting column portion of the microscope stand on both sides thereof, thus facilitating the convenient energization and/or de-energization of either the upper or lower illuminator means from either side of the microscope stand.

It is a further object of the present invention to provide a novel microscope stand of the character referred to herein wherein virtually all of the electric circuitry and other associated electrical or electronic components are carried within the interior of the microscope stand.

It is a further object of the present invention to provide a novel microscope stand of the character referred to herein wherein the upper and lower illuminator means are further provided with manually controllably adjustable illumination-intensity control means for adjusting the output of either the upper or lower illuminator means to any desired magnitude.

It is the further object of the present invention to provide a novel microscope stand of the character defined herein which is additionally provided with illuminator lamp burn-out protection means for minimizing excess current flow thereto for lamp protection purposes.

Further objects are implicit in the detailed description which follows hereinafter (which is to be considered as an exemplary of, but not specifically limiting, the present invention), and said objects will be apparent to persons skilled in the art after a careful study of the detailed description which follows.

For the purpose of clarifying the nature of the present invention, one exemplary embodiment thereof is illustrated in the hereinbelow-described Figures of the accompanying five sheets of drawings (including a showing of at least one optional additional feature in a very slight modification), the same being described hereinafter.

BRIEF DESCRIPTION OF THE DRAWINGS

FIG. 1 is a three-dimensional, pictorial, isometric view showing one illustrative embodiment of the present invention as seen from a position slightly above, in front of, and at one side of the microscope stand.

FIG. 1A is fragmentary, partially broken-away and greatly simplified cross-sectional view of the intermediate work stage taken substantially along the plane and in the direction indicated by the arrows 1A—1A of FIG. 1 whereby to better show certain portions of the exemplary structure providing for relative movement of the intermediate work stage in the y direction only (in both a positive and negative sense).

FIG. 1B is another fragmentary, partially broken-away and greatly simplified cross-sectional view of the intermediate work stage taken substantially along the plane and in the direction indicated by the arrows 1B—1B of FIG. 1 whereby to better show certain portions of the exemplary structurre providing for relative movement of the intermediate work stage in the x direction only (in either a positive or negative sense).

FIG. 2 is a side elevational view of the embodiment of FIG. 1 as seen in a direct orthographic manner when viewing the near or right side thereof as seen in FIG. 1.

FIG. 2A is an enlarged, fragmentary, partially broken-away, greatly simplified, sectional view taken substantially along the plane and in the direction indicated by the arrows 2A—2A of FIG. 2 and is intended to better show one exemplary dove-tail or tongue and groove type of construction for the slideable mounting of the upper illuminator coupling member relative to the microscope optics mounting ring carried at the forward end of the upper cantilever arm portion of the microscope stand.

FIG. 2B is an enlarged, fragmentary, partially broken-away and somewhat simplified view of that fragmentary portion of FIG. 2 enclosed within the oval or ellipse designated by the arrow 2B of FIG. 2 and is intended to better show the outer and inner construction of the two different pinion gears adapted to be rotated by the two operating knobs for rotary to-linear-movement conversion of such rotation into either X or Y movement of one of the two corresponding longitudinal racks carried by corresponding portions of the intermediate work stage whereby to cause it to move in a corresponding X or Y direction (in either a positive or negative sense).

FIG. 3 is a top view, partly comprising a sectional view and partly comprising a top plan view of the embodiment of FIG. 1, taken substantially along the plane and in the direction of the arrows 3—3 of FIG. 2. It should be clearly understood that certain portions are shown broken-away and in section. Other portions are shown in a non-sectioned top plan view form as viewed in FIG. 3.

FIG. 4 is a front elevational view of the exemplary first embodiment of the invention.

FIG. 5 is a left side elevational view of the exemplary first embodiment of the invention as viewed from the opposite side thereof from that shown in FIG. 2.

FIG. 6 is a somewhat enlarged, fragmentary, partially broken-away, multi-plane view taken substantially along the multiple planes and in the direction indicated by the arrows 6—6 of FIG. 5.

FIG. 7 is a partially broken away rear elevational view of the exemplary first embodiment of the invention.

FIG. 8 is a partially broken-away bottom plan view of the exemplary first embodiment of the invention.

FIG. 8A is greatly enlarged, fragmentary, partially broken-away somewhat simplified, partially sectional view of certain portions of the lower illuminator means taken substantially along the plane and in the direction indicated by the arrows 8A—8A of FIG. 8.

FIG. 9 is a simplified and somewhat diagrammatic electrical schematic view of the electrical components of the exemplary first embodiment of the invention.

FIG. 10 is a reduced-size view very similar to FIG. 1, but illustrates the cooperating use of a worker arm rest which facilitates the comfort of a worker using the microscope for substantial periods of time.

DESCRIPTION OF THE PREFERRED EMBODIMENT

The exemplary microscope stand illustrated in FIGS. 1-10, inclusive, is of a deep-throat, substantially rigid and substantially non-defocusing construction adapted to provide for the controllably positionally adjustable mounting of a large work stage in an intermediate focusing plane relative to microscope optics adapted to be mounted thereabove by said stand and capable of controllable large magnitude movement of such an intermediate work stage in such a focusing plane in mutually perpendicular, substantially horizontal x and y directions. As illustrated, the microscope stand is of substantially C-shaped configuration and is at least partially hollow construction and includes a lower substantially horizontally directed base portion, generally designated at 20, a vertically upwardly spaced, similarly substantially horizontally directed, upper cantilever supporting arm portion, such as is generally designated by the reference numeral 22, having an outer end 24 which is adapted to be provided with microscope-optics-supporting means, such as is generally designated at 26. The cantilever supporting arm portion 22 is also provided with an inner or rear end, such as is generally designated by the reference numeral 28, which is provided with and is effectively connected rigidly to what might be termed an upper end 30 of a substantially hollow, upstanding, interconnecting column portion, generally designated by the reference numeral 32, which has an effective bottom end 34 rigidly connected to an inner or rear end 36 of the previously mentioned base portion 20. This defines an extremely rigid, substantially C-shaped, complete supporting stand having extremely high values of effective modulus of elasticity and stiffness of the upper extended microscope-optics-supporting outer end 24 of the upper cantilever supporting arm portion 22 relative to said underlying base portion 20, whereby to minimize relative vertical displacement therebetween as a result of external environmental conditions which normally may produce such displacement and consequent defocusing action of microscope optics, such as are generally designated by the reference numeral 38 and which are adapted to be carried by the upper cantilever supporting arm portion 22, relative to an intermediate work stage, generally designated by the reference numeral 40, which adapted to be effectively carried by the underlying base portion 20 thereabove and in an intermediate focusing plane.

The above-mentioned extreme rigidity of the outer end 24 of the cantilever arm 22 relative to the base portion 20 is provided by the nature of the construction thereof, wherein the upstanding, interconnecting, vertically directed, post portion 32 is substantially hollow and is defined by the high-strength outer plates, as are corresponding lower outer plate or rail portions of the base portion 20 at the rear thereof and as are corresponding rear parts of the upper cantilever arm portion 22. Thus, it can be seen that when the two outer plates 42 of the vertical post portions 32 are fastened at their upper ends by a series of Allen screws 44 to the intervening members 46, 48 and 50, this provides an extremely rigid construction for the upper cantilever arm portion 22, particularly in view of the fact that the two outer plates 42 are formed with cantilever outer plate extensions 52 integral with the rest of the vertical post portions 54 thereof. This means that there is a virtually maximized rigidity and maximized modulus of elasticity and maximized stiffness in the outer plate ends of the upper cantilever arm portion 22 relative to the base end portions of the outer plates 54 comprising the outer post portions of said outer plates 42. When it is further noted that the rigid side wall or side rail portions 56 of the hollow base portion 20 are firmly and positively rigidly fastened at their rear ends to the bottom portions of the vertical parts 54 of the just-mentioned hollow post plate portions 42 by a series of Allen screws 58 and by additional close-tolerance dowel pins 60 firmly driven into dowel-pin-receiving holes 62, it will readily be understood that maximized stiffness-to-weight ratio is provided for the complete structure and, in particular, for the outer end 24 of the upper cantilever arm portion 22 relative to the entire base member or portion 20.

It should be additionally noted that the microscope-optics-supporting means 26 is rigidly fastened to the front cross member or traverse member 50 which is mounted between the outer ends of the two outer cantilever plate portions 52 and that said fastening is also accomplished in a rigid manner by Allen screw means 64 and dowel pin and dowel pin receiving hole means, such as are indicated generally at 66. In a preferred form, the assembly of the microscope stand is accomplished in a jig or fixture which positively positions all of the parts of the stand just referred to and permits adjustment of the optics 38 relative to the intermediate work stage 40 at the time that the tightening of the various Allen screws, particularly such as those shown at 58, 44 and 64 is effected and at which time the dowel pins 60 and 66 are effectively firmly driven into the dowel-pin-receiving holes so as to rigidly lock all portions of the device in an optically appropriately adjusted relationship for convenient focusing.

It should be noted that, in order to further maximize the high strength-to-weight ratio and the great stiffness-to-weight ratio of the entire microscope stand and, particularly, of the optics-supporting outer end 24 of the upper cantilever arm portion 22 relative to the underlying base portion 20, the plates 42, including the portions 52 and 54 thereof, the plates or rails 56 of the base member 20 and, indeed, all of the plate portions of the complete stand, are preferably made of high strength, high modulus of elasticity tool plate which is frequently work-hardened and work-stiffened in addition to being stress-relieved so as to facilitate the major objective of the present invention relative to its non-defocusing action as a result of external environmental conditions, such as vibration or the like, which frequently has resulted in such defocusing of similar prior art microscope stands.

In the specific construction of the exemplary form of the microscope stand illustrated, the high-rigidity, high-stiffness feature referred to above is further enhanced by the nature of the construction. As is perhaps best shown in FIG. 7, the lower ends of each of the two integral side plates 42 pass vertically through slots 68 in the upper horizontal member 70 of the base portion, generally indicated at 20, at the rear end thereof and extend downward to a bottom plane common with the bottom edges of each of the two structurally reinforcing side rail members or plates 56 of the base portion 20 and are positively and firmly attached thereto by the previously mentioned Allen screws 58 and the dowel pins 60 and dowel-pin-receiving holes 62. This provides an extremely rigid structure since the side plate members 42 are actually integral from the outer end portions 52 of the upper cantilever arm 22 clear down to the lower extensions 72 (shown in FIG. 7) thereof where they are positively and firmly attached to the structural side plates or side rail members by the Allen screws 58 and dowel pins and dowel-pin-receiving holes 60 and 62. Of course, this extremely rigid structure minimizes any relative deflection between the outer optics-supporting-end 24 of the upper cantilever arm 22 and the entire base member or base portion 20.

It should be noted that the rigid upper panel 70 of the base portion 20 is further rigidified by the provision of a tranverse structural member 74 rigidly fastened at the front end of the base 20 by upwardly directed fastening screw means 76 (shown in FIG. 8) and by reason of the fact that the previously mentioned side rail members or side plate members 56 are further attached to the horizontal panel member 70 by additional upwardly directed fastening screws indicated at 78. A protective bottom cover panel member 80 is normally fastened across a bottom hollow interior chamber 82 by fastening screws 84, each centrally positioned inside of a corresponding different one of four elastomeric foot members 86, which are provided for non-marring and non-slipping microscope-stand-supporting contact with any appropriate underlying horizontal supporting surface, such as that shown fragmentarily at 88 in FIG. 8. There is also a circular disc-shaped closure member 90 provided for convenient access to the lower illuminator means 92 for convenient adjustment, repair or replacement if needed.

It should be noted that normally there is always a front vertical post protective cover plate 94 adapted to be fastened by appropriate mechanical fastener, such as screws or the like 96, over the otherwise open front surface of the vertical interconnecting hollow post member or portion of the stand indicated generally at 32. Additionally, a rear cover plate (shown fragmentarily at 98 in FIG. 7) is normally fastened over the rear portion of the vertical post member 32 so as to effectively close off the hollow interior or portion 100 defined therein. Said rear cover plate 98 is adapted to be fastened by suitable mechanical fastener members, such as the plurality of screws indicated at 102. The upper portion of the hollow interior chamber 100 the vertical post portion 32 of the microscope stand is separately closed off by its own rear protective cover member 104 and is adapted to be fastened in said closed relationship by suitable mechanical fastener means, such as multiple screws 106 (best shown in FIG. 7). This provides separate access into the upper portion of the inner chamber 100 of the post 32 for upper illuminator adjustment, repair or replacement purposes, while still leaving the lower portion of the chamber 100 closed to protect the multiple electrical and/or components positioned therein.

It should be noted that the various hollow interior portions of the microscope stand effectively comprise the bottom hollow interior chamber means, indicated generally at 82 and lying within the interior of the base member or portion 20, the hollow interior chamber means or portion 100, lying within the upstanding post member 32 and the upper portion thereof lying partly within the extreme upper end of said post member 32 and the extreme rear end of the cantilever arm portion 22. Said upper portion of the chamber 100 is designated by the reference numeral 110 and is best shown in FIGS. 2 and 3. Said hollow interior chamber portions are effectively available for carrying the various electrical and electronic components of the complete apparatus. In one exemplary arrangement as illustrated, the lower chamber means or portion 82 carries therein an appropriate lower illuminator means stepdown transformer, indicated generally at 112, which is physically shown in FIG. 8 and electrically schematically shown in FIG. 9. Said stepdown transformer is for the purpose of reducing the conventional input voltage (usually approximately 60 cycle AC, 117–120 volts) provided by the AC supply cord 114 to an appropriate lower voltage (usually 6 volts, although not specifically so limited) for appropriately energizing the lower illuminator means lamp 116 of the lower illuminator means, indicated generally at 92, and which, in the exemplary form illustrated comprises a reflectorized halogen lamp of approximately 15 watts power consumption, although not specifically so limited. In the exemplary form illustrated, the lower illuminator halogen lamp 116 is shown physically in FIG. 8A and is shown electrically schematically in FIG. 9. It is provided with an underlying reflector 118 adapted to direct light produced by the halogen lamp 116 upwardly through the lenses of a lower lens system which may comprise a condensor (or collimator), or the like, indicated generally at the location 120, and which, in turn, is provided with a manually rotatable ring 122 which operates an internal iris in the general region indicated at 124 whereby to control the amount of upward light directed from the lower illuminator means 92 which is received through the aperture 125 at the bottom of the intermediate work stage, indicated generally at 40, whereby to provide proper bottom illumination for said intermediate work stage 40 and any workpiece positioned thereon and being microscopically observed by means of the upper microscope optics 38, which include either a pair of binocular eyepieces 126 or a monocular eyepiece 128 in appropriate conventional optical relationship with any of a plurality of lower objective lens systems, such as are shown at 130, 132, and 134, and which are carried by and effectively comprise a lower rotary turret, indicated at 136.

It should be noted that the upper microscope optics 38 are of conventional construction, as are the three lower objective lens systems 130, 132 and 134, and as is the rotary turret 136 carrying same for selective optical alignment of any desired one of the objective lens systems with the upper microscope-optics whereby to vary the effective overall magnification power of the microscope.

The lower lens system or condenser (or collimator) indicated generally at 120, the variable aperture iris-type shutter diaphragm positioned at the location indicated at 124, and the iris-operating ring 122 are of relatively conventional construction, and, therefore, the specific interior details thereof are not shown in great particularity. This is also true of the upper microscope-optics 38 and the lower rotary turret 136 mounting the three different selectable objective lens systems and for substantially the same reasons.

The lower hollow chamber portion 82 also contains portions of the lower illuminator means electric circuitry connected between the transformer means 112 and the lower illuminator means lamp 116 and a pair of lower illumination-controlling switch means, indicated at 138 in the electrical schematic view comprising FIG. 9 and indicated physically at 138 on one side of the upstanding post 32 in FIGS. 1, 2, 4 and 10 and indicated similarly at 138 on the other side of said upstanding post 32 in FIGS. 4, 5, and 7. Neither of said illumination-controlling switch means 138 for energizing or de-energizing the lower illuminator means 92 is contained in the bottom hollow chamber 82, but portions of the electric circuitry, indicated at 139, interconnecting same relative to the transformer 112 and the lower illuminator lamp 116 are contained in said lower hollow chamber means or portion 82. Additionally, said lower illuminator means 92 is effectively provided in circuit therewith with a manually controllably-adjustable illumination intensity control member, indicated generally at 140, which in the example illustrated takes the form of a rheostat physically shown on the side of the vertical post 32 at 140 and electrically schematically shown at 140 in FIG. 9.

The lower illuminator means 92 is also further provided, in circuit therewith with illumination-indication means generally designated at 142 and shown in physical form in FIGS. 1 and 10 and shown in electrical schematic form in FIG. 9. It is illustrated as comprising a light-emitting diode and not only will indicate the energization or non-energization of the lower illuminator lamp means 116, but will also indicate the extent of the energization thereof as controlled by the rheostat 140.

In the exemplary form illustated, the lower hollow chamber portion 82 also carries therein a thermally-responsive variable resistance means, having a variable resistance temperature coefficient which is the inverse of and is adapted to substantially compensate for an oppositely-directed variable resistance temperature coefficient of the illuminator lamp means 116. Said thermally-responsive variable-resistance means may comprise what is known in the electronic art as a "Thermistor," as is schematically indicated at 144 in FIG. 9 and physically indicated at 144 in FIG. 8.

Thus, it is understood that the lower illuminator means 92 can be readily adjusted by merely grasping the external knob 210 of the rheostat 140 (assuming, of course that either the left lower switch 138 or the right lower switch 138 has been operated into circuit-closing condition) and the light output of the lower illuminator lamp 116 will be correspondingly modified to whatever level is desired by a person using the microscope. Of course, simultaneously, the light-emitting diode 142 will be energized and will produce a visibly observable, low-level light output corresponding to the light output of the lower illuminator lamp 116 so that a person using the microscope will not only be aware of the fact that the lower illuminator means 92 is energized, but will be apprised of approximately the magnitude of the light output therefrom. Of course, in those cases where color photography of some work item carried by the work stage 40 is intended (by photography through the microscope) or where color television reproduction (through the microscope) is intended, it may be that adjustment of the light output of the lower illuminator means 92 by adjusting the rheostat 140 may produce certain shifts in effective "color temperature" which may not be desired. This can be corrected by using the iris-type shutter or diaphragm located in the region indicated at 124 by rotating the iris-adjustment ring 122. This type of light output adjustment will not change the color temperature thereof. In the case of direct viewing of work on the work stage 40 or of black and white photographing, thereof, the question of color temperature shifts becomes unimportant and all such adjustment may be readily effected by merely adjusting the rheostat 140 on the right side of the upstanding post portion 32 of the complete microscope stand.

The hollow rear interior chamber means or portion 100 is shown as carrying another stepdown transformer, indicated generally at 146 and in physical form in FIG. 7 and in electrical schematic form in FIG. 9. Said transformer 146 is a stepdown transformer having a tapped secondary winding 148 with one set of selective secondary output terminals 150 and 152 which provide one particular low-voltage output (usually of approximately 6 volts, although not specifically so limited) arranged to energize a low-power, upper illuminator means lamp 154 of an upper illuminator means, indicated generally at 156, and to do so by way of electric circuitry 158 which is also connected to an upper illumination-indication means, which is shown as comprising a light-emitting diode 160, and with said low-power upper illuminator lamp 154 being also in circuit with a thermally-responsive variable resistance means having a variable resistance temperature coefficient, which is the inverse of, and is adapted to substantially compensate for, the oppositely-directed variable resistance temperature coefficient of the low-power upper illuminator means lamp 154. This may comprise what is known in the electronic art as a "Thermistor," as indicated at 162 in electrical schematic form in FIG. 9 and as indicated in physical form in 162 in FIG. 7.

The low-power upper illuminator lamp means 154 is adapted to be longitudinally slideably mounted in a tube 164 adapted to be carried in the upper hollow interior chamber 110 at the top of the vertical post 32 and at the rear of the upper cantilever arm portion 22 in a forwardly extending manner, as is best shown in FIGS. 2 and 3. The low-power, upper illuminator lamp 154 is provided with a rear-positioned reflector 166 very similar in principle to the previously mentioned bottom reflector 118 of the lower illuminator lamp means 116. However, in the case of the upper, low-power lamp 154, the rear-positioned reflector means 166 is adapted to reflect light emitted by the lamp 154 forwardly along the inside of the hollow tube 164 through a condensing (or collimating) lens system represented by the single lens shown at 168, which is believed to be adequate since such condensing or collimating lens system is well-known in the art. In the example illustrated, the lamp base 170 carrying the low-power upper halogen lamp 154 is positioned within the open rear end 172 of the tube 164 and is locked in any selected longitudinally adjusted position by set screw means 174 or any other equivalent.

The forward end of the tube 164 is adapted to be threadedly mounted on the rear end of another coupling tube 176, which, in turn, has a forward end 178 provided with a sliding dovetail fastening, engagement, or coupling portion, indicated generally at 180, which is adapted to longitudinally slideably engage male and female dovetail portions carried by the mounting ring 182 and the forward coupling or attachment portion 180, which not only carries the rear-positioned tube portions 176 and 164, (mounting the upper illuminator lamp means 154), but which also carries the previously mentioned rotary turret 136 mounting the three different selectable objective lens systems 130, 132 and 134. This sliding dovetail coupling arrangement is best illustrated with respect to one representative side of same in the enlarged fragmentary partially broken away and greatly simplified sectional view set forth in FIG. 2A, wherein one representative side of the male dovetail carried by the forward coupling portion 180 is illustrated at 184 and one representative corresponding female dovetail portion carried along the bottom surface of the mounting ring 182, is fragmentarily indicated by the reference numeral 186.

It should be clearly understood that when the entire upper illuminator mounting assembly is moved toward the left as viewed in FIGS. 2 and 3, from a disengaged position thereof and with the coupling or attachment portion 180 properly aligned with the bottom surface of the mounting ring 182 so that the corresponding male and female dovetail 184 and 186 are properly aligned, full locking engagement between the two dovetail portions 184 and 186 can be effected. The fully-engaged relationship is best shown in FIGS. 2 and 3 and mounts the entire rotary objective turret 136 and the entire upper illuminator means 156 in fully-operative relationship to the rest of the apparatus, as is clearly shown in FIGS. 2 and 3.

It should be understood that the mounting ring 182 mentioned above is firmly attached to the rigid structural cross member 50 at the extreme outer end of 24 of the upper cantilever arm portion 22 of the stand by firm mechanical attachment means, such as threaded fastener means, an inner end portion of which is clearly shown at 188. It should further be noted that dowel pin and dowel-pin-receiving hole means, such as are indicated at 190, are preferably also employed for positively rigidifying said locking ring 182 in the proper physical and optical position, preferably while the entire device is being assembled in a very precisely-dimensioned assembly jog or fixture.

The threaded engagement of the rear tubular part 176 of the coupling attachment portion 180 relative to the threaded forward end of the upper illuminator tube 164 provides a convenient engageable and disengageable connection between the front coupling portion 180 and the entire rear tubular portion 164, (carrying the upper illuminator lamp 154) so that said lamp-carrying tube 164 can be removed without the necessity of de-coupling the forward coupling or attachment portion 180 from the mounting ring 182. This can be conveniently done from the rear of the entire stand after the rear upper cover plate portion 104 (best shown in FIG. 7) is removed. This will allow replacement or interchanging of the illuminator lamp, any of the lenses, the reflector or any of the rest of the structure of the upper illuminator means 156 in a simple and convenient manner.

The rear tubular portion 178 of the coupling or attachment member 180 is shown as being provided with a slideably moveable, two-position, aperture-modifying means comprising a manual actuating knob 192 connected by a slide pin 193 extending through an aperture 194 in one of the outer cantilever arm plate members 52 to a slideplate 196 which is adapted to be moved between a centrally-opaque, rim-transmissive position as shown in FIG. 3 and a fully-open position when the hole 198 is moved into the central position aligned with the low-power upper illuminator lamp 154 and the inner light-receiving part of the coupling member 180, which provides upper light downwardly directed onto the work stage 40. A stop pin 200 at the remote end of the slideplate 196 limits the movement of the entire aperture modifier in one direction, while the bend 202 in the operating arm, or slidepin, 193 limits movement of the slideplate 196 in the opposite direction.

It should be noted that when the slideplate 196 is in the position shown in FIG. 3 with the center opaque and the rim transmissive, that provides what is usually termed "dark-field" illumination. Conversely, when the slideplate 196 is moved to the opposite extreme so the fully open aperture 198 is in the central optical path, that provides what is generally known in the art as "bright-field" illumination.

An alternate set of transformer terminals comprising the previously mentioned terminal 150 and another terminal 204 of the upper illuminator means transformer 146 are adapted to be alternately connected to a higher voltage higher-power, upper illuminator lamp, such as is shown at 206 in the electrical schematic view set forth in FIG. 9 and is not shown physically, although it would be effectively mounted as an alternately energizable, upper illuminator lamp in alignment with the central optical path of the tubes 164 and 176 (best shown in FIGS. 2 and 3) so as to function in lieu of the previously described low-power, upper illuminator lamp 154. In other words, either one or the other of the two different upper illuminator lamps, comprising the low-power lamp 154 or the high-power lamp 206 would be arranged to be energized from the corresponding terminals 150 and 152 or 150 and 204, respectively, and the electrical schematic view set forth in FIG. 9 shows the entire alternately energizable arrangement. It should be understood that in the physical views showing the actual structure of the device, the high-power lamp 206 would effectively replace the low-power lamp 154 and that the electrical schematic showing of both in FIG. 9 is believed to be entirely adequate for disclosure purposes and that physically showing the alternate lamp in place would nearly unnecessarily add to the length and complexity of the drawings.

One or more "Thermistors," such as are shown connected in parallel at 208, may be employed for lamp protection purposes (for protecting the high-power lamp 206) in the same manner as the low-power "Thermistor" 162 functions to protect the low-power lamp 154. The showing of multiple "Thermistors" 208 in parallel is merely a matter of convenience since such parallel-connected "Thermistors" will effectively divide up the large current flow fed to the high-power lamp 206 (which for example, may be of the order of 100 watts, although not specifically so limited) while maintaining the individual resistance-temperature coefficient characteristics. However, it is entirely feasible to employ a single "Thermistor" which has the right current-handling capabilities while also having the right resistance variation as a function of temperature change.

Inasmuch as the manually controllably adjustable illumination intensity control member for the upper illuminator means 156 must be capable of handling the substantial adjusted power supplied to the high-power upper illuminator means 206 whenever it is selectively arranged for energization, a manually controllably adjustable rheostat similar to that shown at 140 in electrical schematic form in FIG. 9 and in physical form 140 in FIGS. 1, 2, 4, 7 and 10, is not practical because there would be too much heat produced in such a rheostat because of the large amount of power flowing therethrough to the high-voltage upper illuminator lamp 206. Therefore, the manually controllably adjustable illumination-intensity-control member for the upper illuminator means is generally designated by the reference numeral 210 and does not comprise a rheostat but instead comprises an adjustable multi-electronic-element circuit unit commonly known as a "Triac" and employs what is known as an SCR or silicon controlled rectifier for controlling the amount of AC power passed therethrough. The detailed structure of said adjustable SCR power controlling unit 210 is not shown in detail, but is merely shown in block diagrammatic form at 210 in FIG. 9 and is merely shown exteriorly in physical form at 210 in FIG. 7 wherein it is provided with an exterior control knob, specifically designated by the reference numeral 212, for manual rotation for controlable adjustment of the amount of AC power which is permitted to pass through the adjustable power-flow-controlling SCR unit 210. It is illustrated in FIG. 9 in block diagrammatic form primarily because such adjustable AC power controlling SCR units are well known in the art.

The upper illumination switch means is again of a double pushbutton type mounted in similar upper locations on each side of the vertical post member 32, as indicated at 214, thus making it possible to energize either of the two upper illuminator lamp means 154 or 206 from either the right or left side of the vertical post member 32 of the stand. The previously mentioned illumination indication means 160 for the upper illuminator means 154 also may be connected for energization when the high-power illuminator means 206 is energized or it may be supplemented by an additional light emitting diode to provide an indication whenever the high-power, upper illuminator lamp means 206 is energized and to correspondingly indicate roughly the magnitude of the energization thereof by the brightness of said light emitting diode.

It should be noted that both the twin lower illumination switch means 138 and the twin upper illumination switch means 214 are capable of energization of the corresponding lower illuminator means 92 or upper illuminator means 156 as a result of manual actuation of either switch of the corresponding pair of switches 138 or 214 by reason of the intervening parallel wire connections thereof as indicated at 216 in the case of the twin lower illumination controlling switches 138 and as indicated at 218 in the case of the upper pair of illumination controlling switches 214.

A main switch is indicated at 218 and comprises an inner AC line switch 220 and a neon bulb (or other low-power lamp) such as indicated at 222, which actually comprises the pushbutton of the electrical switch 220. The arrangement is such that when the main switch 218 is closed, the neon lamp 222 is energized and emits therefrom low-power illumination so that one is aware of the fact that power is on in the electrical circuitry and components positioned within the various hollow portions of the microscope stand. A removable and replaceable fuse is shown electrically schematically at 224 in FIG. 9 and is shown physically at 224 in FIG. 7.

The horizontal upper plate 70 of the base member 20 firmly and fixedly carries an upstanding structural member 226 which is positively attached thereto in any suitable completely rigid manner. In the example illustrated, as is best shown in FIG. 8, said attachment is provided by four upwardly extending threaded fastener elements or screws, as indicated at 228. However, any suitable mode of rigidly fastening the upwardly extended structural member 226 to a properly located central portion of the upper plate 70 of the base member 20 may be employed in lieu thereof. The upwardly extending structural member 226 comprises a special kind of focusing gear box well known in the art which has an inner multiple gear set of a rack and pinion type having an input pinion gear coupled to and adapted to be driven by a knurled outer manual operating knob 230 which rotates around a horizontal axis of rotation and which correspondingly rotates an inner input pinion gear of an inner gear set and which effectively has an output pinion gear directly coupled to a vertically positioned inner rack, comprising a vertically directed and extending set of transversely directed inner gear teeth, coupled to an outer vertical slider member 232 mounted in appropriate vertically-directed trackways, such as grooved interior slideways, so that the vertical slider member 232 will be controlled for vertical movement along an exact vertical line and will not be allowed to shift laterally, transversely in either an x or y direction, but will be permitted to move only vertically in response to rotation of the driving knob 230 driving the inner pinion gear set and coupled output rack gear connected to the vertical slider member 232. In other words, the entire gear set unit, which is generally designated by the reference numeral 234, may be said to comprise a precisely calibrated, vertical-positioned-adjustment mechanism for vertically adjusting the lower plate 236 of the intermediate work stage, indicated generally at 40, in a precisely controlled manner according to the relative rotative position of the external operating knob 230 and the rotatively separate, centrally positioned Vernier, final small-scale adjustment knob 238. Of course, the Vernier adjustment knob 238 works in a way well known in the art, being a geared-down drive interiorly connected with respect to the previously mentioned main input pinion gear driven directly by the outer operating knob 230 so that any particular magnitude of rotation of the Vernier knob 238 will produce a very much smaller rotation of the main operating knob 230 (in fact, divided by some predetermined factor to produce a reduction corresponding to the internal gear ratio coupling the Vernier knob 238 to the main operating knob 230).

It should be noted that the main operating knob 230 and the trimming or final adjustment Vernier knob 238 are duplicated on each side of the complete gear set assembly 234 which, in effect, comprises a focusing mechanism for the entire work stage 40. Thus, it is possible to vertically adjust or focus the entire work stage 40 and, in particular, the upper transparent workpiece-receiving plate 240 thereof from either side of the focusing structure 234. This is for the convenience of a person working for long hours at the microscope. It should be noted that the gearing of the focusing means 234 is of a unidirectionally-operable type so that the vertical position of the work-stage-carrying transparent plate 240 can be precisely vertically adjusted by adjusting either of the mean operating knobs 230 and either of the two trimming adjustment Vernier knobs 238, but once that adjustment is complete, the work stage 40 will remain in the precisely vertically adjusted position such that the upper surface of the work-stage-receiving plate 240 is in a precisely desired, proper, intermediate focusing plane for a person using the eye piece lenses of the upper microscope optics 38. In other words, no amount of force applied to the intermediate work stage 40 will cause any vertical movement thereof because of the unidirectional nature of the gearing.

The work stage 40 is arranged for maximum controllably adjustable horizontal movement while remaining in a precisely vertically adjusted, horizontally directed, focusing plane so that the entire work stage can be adjusted to an x direction or a y direction, the x direction being arbitrarily indicated by the double headed arrow label x and the y direction being arbitrarily indicated by the double headed arrow label y. This will allow a relatively large work piece (not shown) to be placed on the transparent work-piece-receiving plate 240 and viewed through the microscope and to be followed by adjustment of the entire intermediate work stage 40 in either the x direction or the y direction, or both, until virtually the entire surface of the work piece has been selectively moved directly under the optical axis of the microscope optics for direct viewing thereof through the microscope. Thus, the complete x and y direction adjustability of the large intermediate work stage 40 takes advantage of the very deep throat provided between the extended lower base portion 20 and the correspondingly extended upper cantilever arm portion 22 which make it possible to microscopically closely examine various surface area portions of much larger work pieces than has been possible with prior art microscopes and microscope stands.

In the example illustrated, the intermediate work stage 40 comprises the previously mentioned lower fixed plate 236 which is rigidly fastened to the upper surface of the vertical slider 232 of the vertical focusing mechanism 234 so that said fixed lower plate 236 can be vertically adjusted to any desired vertical location by the focusing mechanism 234 in the manner previously described. Said fixed lower plate 236 is attached to the slider 232 by a semi-circular attachment member 242 and appropriate fastening screws in a position such as to be out of alignment with, and to not interefere with, a vertically directed through-hole 244 in said lower plate 236 centered on the optical axis of the microscope, which is shown in phantom lines at 246. Said lower plate 236 has a second plate 248 mounted directly thereabove for horizontal fore and aft movement only in the y direction. This is made possible, in the example illustrated, by a longitudinal one-half of a longitudinal grooved raceway 250 extending along each side edge of the bottom plate 236 and by fastening a locking strip 252 immediately below each side edge of the second or middle plate 248 by the use of appropriate fastening screws, with inner edges of each side locking strip 252 being similarly provided with the other half of a longitudinal grooved raceway 254 in direct longitudinally directed lateral opposition to the first-mentioned half portion of a longitudinal grooved raceway 250. Positioned between the two opposite longitudinal raceway half portions 250 and 254 is a longitudinal ball-bearing-carrier 256 carrying a plurality of ball bearings 258. Thus, it can readily be seen that the arrangement is such that the intermediate or second horizontal plate 248 is freely mounted for movement in the y direction in either a positive or negative sense but that it is restrained from any other type of movement relative to the underlying bottom plate member 236. A third or upper plate member 260 is mounted in virtually the same manner relative to the intermediate plate member 248 as the just described mounting of said intermediate plate member 248 relative to the bottom plate member 236 except that the mounting of the third or upper plate 260 is such as to provide for free movement therof in the x direction only, in either a positive or negative sense, and to permit no movement thereof in the y direction relative to the underlying intermediate or second plate 248. This is accomplished by fastening two transversely directed, front and rear locking strips 262 immediately under the corresponding front and rear edges of the third or upper plate 260 through the use of appropriate fastening screws (not shown, but which are well known in art). Each of said front and rear locking strips 262 carries a corresponding longitudinal half raceway portion 264 opposite to a similar half raceway portion 266 carried by the corresponding front and rear edges of te intermediate or second plate 248, with a longitudinal ball-bearing-carrier 268 being positioned therebetween and carrying a plurality of ball bearings 270 spaced therealong. This freely mounts the top plate 260 for movement in only the x direction (positive or negative) relative to the immediate plate 248 and positively prevents any other kind of relative movement therebetween.

The means for causing x and y movement of the intermediate and top plates 248 and 260 relative to the bottom plate 236 comprise a double set of operating knobs 272 and 274 which are coaxially arranged, with the outer knurled knob 274 being directly connected to a pinion 276 which is in engagement with a longitudinal rack 278 firmly fastened underneath the edge of the bottom plate 236, while the pinion 276 is pivotally attached to the second or intermediate plate 248 so that rotation of the operating knob 274 will cause the entire intermediate plate 248 and of course the top plate 260 carried thereby, along with the entire double knob set 272 and 274 to move in the y direction only (in either a positive or negative sense). The lower or smaller operating knob 272 has a vertical shaft 273 which extends vertically completely through the hollow interior of the knob 274 and the first-mentioned pinion 276 and upwardly through the members 252 and 248 into edge alignment with a transversely directed longitudinal rack member 280 firmly fastened directly underneath and attached to the bottom surface of the top plate 260 where said extended shaft 273, coupled to the lower operating knob 272, is provided with a second and smaller pinion 282 which engages and drives the longitudinal rack 280 and, consequently, causes corresponding movement of the upper or top plate 260 in only the x direction (in either a positive or negative sense).

It should be noted that the just-described x and y movement adjustment means is representative only and may be modified within the broad scope and spirit of the present invention.

The intermediate plate 248 is provided with a rectangular cutout or window 284 which is of a length such in the y direction as to allow full y direction adjustment of said intermediate plate 248, and consequently of the top plate 260 carried thereby, without ever blocking off or interfering with the open region around the vertical line of sight along the optical axis 246 of the microscope. Of course, the top plate 260 is shown as being provided with a large substantially square cutout 286 which carries the transparent work-piece-receiving plate or window 240 so that full x and y movement of the top plate 260 can be achieved without ever interfering with or closing off the vertical opening centered around the optical axis 246 of the microscope.

In the example illustrated, an additional vertically adjustable member 288 is vertically slideably carried by the front end of the previously mentioned vertically adjustable slider member 232 of the focusing mechanism 234 and it merely comprises an exterior operating knob 290 driving an internal pinion engaged with an internal vertically directed rack and slideably mounted in grooved dovetailed alideways so that the mounting ring 292 can be vertically adjusted if desired. It should be noted that the ring 292 is centered on the optical axis 246 and has a plurality of threaded and/or resilient fastener members 294, all of which are provided for the purpose of mounting an additional collimator, or other light-ray-processing means, between the source of light from the lower illuminator means 92 and a work piece positioned on a central part of the transparent work-piece-receiving plate or window 240, if desired.

FIG. 10 illustrates a double arm rest, indicated generally at 296, which comprises a flat base plate 298 adapted to be slipped under the bottom of the base portion 20 of the microscope stand so as to be interposed between the bottom 20 of the stand and an underlying horizontal supporting surface, such as that shown in 88 in FIGS. 2, 4, 5, 7, and 10. In a preferred form, the thin sheet base plate 298 will also slip underneath the four resilient foot members 86 and such an underlying supporting surface (bench, table, or the like) whereby the weight of the entire stand and microscope will impart locking force to the compressible and also frictional foot members 86 (which are often made of rubber or elastomeric plastic resin) whereby to firmly lock it between said foot members 86 and the underlying horizontal supporting surface 88. Each side portion of the double arm rest 296 is provided with a similar, but positionally reversed, compressible forearm-receiving pad 300 which may comprise suitable inner compressible or elastomeric padding or foam material, or any desired combination thereof, (usually mounted on a rigid base plate) and a exterior covering, such as leather or plastic sheeting of a type of simulating leather in appearance, the exterior sheeting being designated numeral 302. It will be noted that the auxiliary arm rests 296 minimize fatigue for a worker who may work at a microscope for substantial periods of time and who otherwise would be attempting to rest his or her forearms on the horizontal supporting surface 88 which is usually relatively hard. The increased comfort provided by the double arm rest 296 leads to decreased worker fatigue and, consequently, greatly increased worker efficiency.

It should be noted that while the invention has been described with specific reference to FIGS. 1–10 inclusive, illustrating one exemplary representative embodiment of the invention, it should be quite clear that the invention is not specifically limited to the precise details of the one exemplary representative embodiment, described for illustrative purposes. It should be understood that various equivalents may be employed in lieu of certain particular structural features of the exemplary representative form illustrated and described and that this can be done entirely within the scope and broad teachings of the present invention and that all such modifications and all such equivalents are intended to be included and comprehended within the broad scope of the present invention. This is true with respect to the mechanical elements of the invention, the optical elements of the invention, and the electrical or electronic elements of the invention, and many equivalents to various of said elements will occur to those skilled in the art, and all such are also intended to be included and comprehended herein. For example, various optical systems may be employed and the novel stand of the present invention may be initially supplied with any of a variety of different types of microscope optics or may be effectively retrofitted to a variety of pre-existing microscope optics systems. Also, various types of focusing mechanisms of positive geared driving types or of frictional driving types or otherwise, whether pre-existing or specifically devised for the system, may be employed in lieu of the exemplary arrangement described and illustrated for representative purposes only. This is also true with respect to the intermediate work stage and the adjusting mechanism for positionally adjusting it in the x or y directions. The same statement is also applicable relative to the lens systems, such as condensors, collimators, or the like associated with the upper and lower illuminiator means. Furthermore, the upper and lower illuminator means may also be modified substantially within the broad scope of the present invention, and the power supply, switching means and power-adjusting means for the two illuminator means may be modified in a certain range of functional equivalency lying within the broad scope of the present invention. Silicon controlled rectifier means, rheostat means, or various other power-controlling means may be employed for adjusting the power supplied to either illuminator means.

With respect to the "Thermistors" employed for lamp burnout protection purposes, it should be noted that they comprise appropriate resistors having negative coefficients of resistance as a function of temperature variation and while they provide simplified lamp protection, other functionally equivalent circuit arrangements and/or components may be employed in lieu thereof.

With respect to the mechanical structure, certain modifications thereof may be employed, provided that the maximized strength-to-weight ratio and maximized stiffness-to-weight ratio of the outer optics supporting portion of the stand and the lower portion of the stand mounting the intermediate work stage are maintained.

It should be understood that the figures of the drawings and the specific description thereof set forth in the specification are for the purpose of illustrating the present invention in one understandable representative, but not necessarily specifically limiting, form. Therefore, they are not to be construed as specifically limiting the present invention to the precise and detailed specific structures shown in the figures and specifically described hereinbefore. Rather, the real invention is intended to include substantially equivalent constructions embodying the basic teachings and inventive concept of the present invention.

What is claimed is:

1. An improved microscope stand of a deep-throat, substantially rigid and substantially non-defocusing construction adapted to provide for the controllably positionally adjustable mounting of a large work stage in an intermediate focusing plane relative to microscope optics adapted to be mounted thereabove by said stand and capable of controllable large magnitude movement of such an intermediate work stage in such a focusing plane in mutually perpendicular substantially horizontal x and y directions, comprising: a substantially C-shaped microscope stand means of at least partially hollow construction having a lower substantially horizontally directed base portion, a vertically upwardly spaced substantially horizontally directed upper cantilever supporting arm portion having an outer end provided with microscope-optics-supporting means and an inner or rear end provided and effectively connected rigidly to an upper end of a substantially hollow upstanding interconnecting column portion having a bottom end rigidly connected to an inner or rear end of said base portion, thus defining an extremely rigid substantially C-shaped supporting stand having extremely high values of effective modulus of elasticity and stiffness of said extended microscope-optics-supporting outer end of said upper cantilever supporting arm portion relative to said base portion whereby to minimize relative vertical displacement therebetween as a result of external environmental conditions which normally may produce displacement and consequent defocusing action of microscope optics adapted to be carried by such an upper cantilever supporting arm portion relative to a work stage adapted to be effectively carried by such a base portion in an intermediate focusing plane; said hollow portions of said stand being effectively defined by high-strength outer plates provided with and rigidly fastened together by high-rigidity close-tolerance mechanical fastener means of close fitting male and female paired element construction rigidly fastening said outer plates together in a manner defining a hollow interior and whereby to provide said effective C-shaped stand in a construction of minimal weight and maximum stiffness having an effectively maximized strength-to-weight and stiffness-to-weight ratio; and intermediate horizontal focusing plane stage means provided with and mounted upon and above an underlying stage-supporting and x and y plane position-adjusting means effectively attached to and rigidly supported by said base portion in a manner spaced substantially above said base portion and substantially below said upper cantilever supporting arm portion at an intermediate location therebetween, said x and y plane position-adjusting means being manually operable to move the work stage horizontally in mutually-perpendicular substantially horizontal x and y directions.

2. An improved microscope stand as defined in claim 1, wherein hollow interior of said stand effectively defines hollow interior chamber means adapted to carry electrical and/or electronic accessory equipment for use with a complete microscope comprising said stand when provided with and carrying microscope optics and an intermediately positioned work stage adapted to lie in an intermediate focusing plane and adapted to be effectively controllably positionally adjustably carried by said base portion.

3. An improved microscope stand of a deep-throat, substantially rigid and substantially non-defocusing construction adapted to provide for the controllably positionally adjustable mounting of a large work stage in an intermediate focusing plane relative to microscope optics adapted to be mounted thereabove by said stand and capable of controllable large magnitude movement of such an intermediate work stage in such a focusing plane in mutually perpendicular substantially horizontal x and y directions, comprising: a substantially C-shaped microscope stand means of at least partially hollow construction having a lower substantially horizontally directed base portion, a vertically upwardly spaced substantially horizontally directed upper cantilever supporting arm portion having an outer end provided with microscope-optics-supporting means and an inner or rear end provided with and effectively connected rigidly to an upper end of a substantially hollow upstanding interconnecting column portion having a bottom end rigidly connected to an inner or rear end of said base portion, thus defining an extremely rigid substantially C-shaped supporting stand having extremely high values of effective modulus of elasticity and stiffness of said extended microscope-optics-supporting outer end of said upper cantilever supporting arm portion relative to said base portion whereby to minimize relative vertical displacement therebetween as a result of external environmental conditions which normally may produce such displacement and consequent defocusing action of microscope optics adapted to be carried by such an upper cantilever supporting arm portion relative to a work stage adapted to be effectively carried by such a base portion in an intermediate focusing plane; said hollow portion of said upstanding interconnecting column portion of said stand being effectively defined by high-strength work-hardened and work-stiffened outer plates provided with and rigidly fastened together by high-rigidity close-tolerance screw and dowel pin and mating hole construction rigidly fastening said plates together in a manner defining said effective C-shaped stand in a construction of minimal weight and maximum stiffness having a maximized stiffness-to-weight ratio; and intermediate horizontal focusing plane stage means provided with and mounted upon and above an underlying stage-supporting and x and y plane position-adjusting means effectively attached to and rigidly supported by said base portion in a manner spaced substantially above said base portion and substantially below said upper cantilever supporting arm portion at an intermediate location therebetween, said x and y plane position-adjusting means being manually operable to move the work stage horizontally in mutually-perpendicular substantially horizontal x and y directions.

4. An improved microscope stand as defined in claim 3, wherein said hollow interior of said upstanding interconnecting column portion of said stand effectively defines hollow interior chamber means adapted to carry electrical and/or electronic accessory equipment for use with a complete microscope comprising said stand when provided with and carrying microscope optics and an intermediately positioned work stage adapted to lie in an intermediate focusing plane and adapted to be effectively controllably positionally adjustably carried by said base portion.

5. An improved microscope stand as defined in claim 4, including upper and lower work stage illuminator means provided with corresponding electric circuitry and upper and lower illumination-controlling switch means and corresponding upper and lower illumination-indicating lamp means and electrical connector means for connection to a source of electric power.

6. An improved microscope stand as defined in claim 5, wherein said upper and lower illumination-controlling switch means are similarly carried by left and right sides of said upstanding column portion of said C-shaped stand in similar upper and lower locations correlated with the operation of said upper and lower illumination means whereby to provide for controlled operation of either said upper or lower illuminator means at either side of said upstanding column portion.

7. An improved microscope stand as defined in claim 6, wherein said upper and lower illuminator means are further provided with manually controllably adjustable illumination intensity control members carried by said vertical column means in corresponding upper and lower positions adjacent to said corresponding upper and lower illumination controlling switch means.

8. An improved microscope stand as defined in claim 5, wherein said illumination-indicating lamp means are carried in corresponding positions by an upper surface part of said base portion in a manner whereby the nearest illumination-indication means corresponds to energization of the lower illuminator means and whereby the most remote illumination-indication means corresponds to energization of the upper illuminator means.

9. An improved microscope stand as defined in claim 5, wherein said upper and lower work stage illuminator means and said corresponding electric circuitry, are provided with thermally-responsive variable-resistance means having a variable resistance temperature-responsive coefficient of resistance substantially the inverse of and adapted to substantially compensate for an oppositely directed variable resistance temperature-responsive coefficient of resistance of said illuminator means whereby to provide effective protection of said illuminator means from temporary excess current flow during energization and de-energization thereof.

\* \* \* \* \*